United States Patent Office 3,369,000
Patented Feb. 13, 1968

3,369,000
POLYURETHANE PREPARATIONS CONTAINING HYDROLYZABLE ESTERS
Friedrich Blomeyer, Leverkusen, Bayerwerk, and Hermann Gruber, Reinhard Hebermehl, and Rolf Kubens, Leverkusen, Germany, assignors to Farbenfabriken Bayer Aktiengesellschaft, Leverkusen, Germany, a German corporation
No Drawing. Filed Sept. 20, 1963, Ser. No. 310,472
Claims priority, application Germany, Sept. 29, 1962, F 37,923
6 Claims. (Cl. 260—75)

ABSTRACT OF THE DISCLOSURE

Use of certain hydrolyzable esters, for example, lower alkyl esters of orthoformic acid and tris(beta-chloroethyl)phosphite, as water binding agents in polyurethane preparations.

This invention relates to the preparation of polyurethanes, and particularly to the preparation of transparent and translucent polyurethanes, free from bubbles and foam.

Polyurethanes are obtained by a polyaddition process from polyisocyanates and organic polyvalent compounds containing at least two reactive hydrogen-containing groups as determined by the Zerewitinoff method, which are mixed at room temperature in a mixer, such as, the one disclosed in U.S. Reissue Patent No. 24,514. The mixing is easily carried out when the starting materials are liquid, and not too highly viscous, although the viscosity may be regulated by heating or the use of solvents. The addition reaction then takes place more or less rapidly depending on the reactivity of the isocyanate or the reactive hydrogen groups. The polyurethanes thus obtained generally have a very bubbly to foamy structure since the reactive hydrogen-containing compound usually contains small quantities of water. Where it is necessary to use fillers and pigments, the proportion of water is increased. This water reacts with the free isocyanate groups to split off carbon dioxide, which causes the formation of bubbles, or in an exaggerated case, a foam.

It is well known that the addition of sodium aluminum silicates will prevent this effect of moisture when combinations of liquid polyisocyanates and liquid compounds containing reactive hydrogen-containing groups free from solvents are used. However, the use of these molecular sieves to adsorb the water has a marked disadvantage since the sodium aluminum silicates are powder substances which prevent the polyurethane product from being clear and transparent or translucent.

It is, therefore, an object of this invention to provide a method for the preparation of clear transparent and translucent polyurethanes. It is a further object of this invention to provide a method for the preparation of bubble and foam free polyurethanes which are transparent or translucent. A still further object is to provide water-binding agents which will react chemically to remove the cause of the objectionable bubble and foam structure of the polyurethanes.

The foregoing objects and others which will become apparent from the following description are accomplished in accordance with this invention, generally speaking, by providing a method for the preparation of polyurethanes substantially free from bubbles and foam which comprises reacting an organic polyisocyanate with an organic compound containing reactive hydrogen-containing groups in a liquid or pasty reaction mixture, or in other words, in a non-solid reaction mixture, in which some traces of water have been introduced by the components, and including a hydrolyzable ester in this reaction mixture to act as a chemical water-binding agent. This water-binding agent is preferably mixed thoroughly into the clear or pigmented reactive hydrogen-containing compound which is the reactant that usually contains the traces of water and left at room temperature until the chemical water-binding process is completed, such process consisting in the hydrolysis of the ester by the traces of water to split off an alcohol.

Any suitable ester which acts as a chemical water-binding agent may be used, including, for example, the lower alkyl esters of orthoformic acid, particularly orthoformic acid ethyl ester, although the methyl, propyl, and butyl esters of orthoformic acid may also be utilized to good advantage, and trichlorotriethylphosphite.

These chemical water-binding agents differ broadly in their speed of hydrolysis and in their efficiency as water-binding agents. However, this invention contemplates in its broadest aspect, the utilization of any amount of the ester, although in a preferred embodiment of the invention, the use of a quantity between 2% and 6% calculated on the total quantity by weight of the mixture is favored. The amount to be added to the clear or pigmented and filled mixtures of organic polyisocyanate and organic compounds containing reactive hydrogen containing groups depends on the water content of these mixtures which should not be greater than 1% by weight and generally lies in the range of 0.5% to 1%.

Orthoformic acid alkyl esters which hydrolyze to form an alcohol and a formic acid ester require a detectable, though very short time for hydrolysis. Orthoformic acid ethyl ester has the desired chemical water-binding effect with clear mixtures of polyisocyanates and reactive hydrogen-containing compounds when about 2% to 3% is added; whereas, with pigmented mixtures containing a high proportion of filler, the effect is achieved when about 4% to 5% is added, calculated on the total quantity of the mixture.

The process of hydrolysis of the phosphorous acid trichlorotriethyl ester to chloroethanol and dichlorodiethylphosphite is so slow that this substance does not show its water-grinding property until it has remained in the reaction mixture for at least four days. Trichlorotriethylphosphite must be added in quantities of about 4.5% to 6%, by weight, calculated on the total quantity of the mixture, in order to insure a chemical water-grinding effect. The action of the phosphorous acid trialkyl ester is obviously linked up with a certain constitution of the alkyl group since the normal alkyl esters are ineffective as chemical water-binding agents. The process of hydrolysis is promoted only when there is a substituent in the alkyl group, particularly the ethyl group. Suitable substituents are halogen atoms, particularly chlorine, or the phenol ether group, which may, in turn, contain two methyl substituents in the aromatic nucleus. Bulky and particularly hydrophobic substituents in the aromatic nucleus may make hydrolysis more difficult.

Ortho-formic acid alkyl esters and trichlorotriethylphosphite do not accelerate the organic polyisocyanate reactive hydrogen addition reaction to the same extent as the sodium aluminum silicates and, therefore, give longer processing times. This may perhaps be explained on the dilution principle. The products of hydrolysis may partly add isocyanate groups and partly remain in the polyurethane mass, thereby producing plasticizing effects.

In addition, both ortho-formic acid alkyl esters and trichlorotriethylphosphite and their hydrolysis products are liquid and clear, and transparent high molecular weight polyurethanes may be prepared with them.

Any suitable polyvalent isocyanates that are liquid at the reaction temperatures are suitable in the invention as well as solid polyvalent isocyanates that are liquefied in practically non-volatile solvents, for example, plasticizers. Examples of liquid polyisocyanates are given, for example, in "Annalen," 562, 75, 1949. The following, taken from this list, are particularly important:

Polymethylene diisocyanates, for example, hexamethylene diisocyanate, aliphatic diisocyanates having an incorporated aromatic or hydroaromatic ring system, for example, $\omega,\omega'$-diisocyanate - 1,3 - dimethylbenzene, mixed aromatic-aliphatic diisocyanates, e.g., 3-phenylisocyanate-1$\alpha$-ethylisocyanate, diisocyanates, e.g., 3-phenylisocyanate-1$\alpha$-ethylisocyanate, diisocyanates of benzene and its homologues, e.g., tolylene diisocyanate mixtures, technical diphenylmethane-4,4'-diisocyanate, 3,3' - dimethyldiphenylmethane-4,4'-diisocyanate, 1,1-diphenylcyclohexyl-4,4'-diisocyanate.

It is also possible to use polyvalent polyisocyanates which have been produced from polyvalent isocyanates, particularly diisocyanates, and small quantities of water by biuret formation by a process disclosed in patent application Ser. No. 806,444, (now U.S. Patent 3,124,605. Thus, for example, a liquid biuret triisocyanate is obtained from 3 moles of hexamethylenediisocyanate and 1 mole of water. Solid polyvalent biuret triisocyanates can be used only if they can be dissolved in practically non-volatile solvents, such as, plasticizers. Polyvalent polyisocyanates which have been obtained by di- or trimerization, for example of diisocyanates, can be used only if they are liquid or if they can be dissolved in practically non-volatile solvents.

Instead of monomeric diisocyanates, liquid or liquefied polyurethane adducts or addition compounds having terminal isocyanate groups may be used. These include reaction products of polyisocyanates, usually diisocyanates, treated in molar excess under substantially anhydrous conditions with a compound containing reactive hydrogen atoms. Such addition products may be obtained, for example, from polyhydric alcohols, such as, ethylene glycol, diethylene glycol, butylene glycol, glycerol, trimethylolpropane, hexanetriol, polypropylene glycol, and polyethylene glycol, and from castor oil, polyesters containing hydroxyl groups, natural oils, and fats which have been subjected to alcoholysis by treating with an excess of polyisocyanates, particularly hexamethyleneisocyanate, tolylene diisocyanate, and diphenylmethane diisocyanate.

Any suitable organic compound containing at least two active hydrogen-containing groups as determined by the Zerewitinoff method, said groups being reactive with an isocyanate group, may be reacted with an organic polyisocyanate in accordance with the process of the present invention.

Any suitable organic compound containing at least two active hydrogen containing groups as determined by the Zerewitinoff method, said groups being reactive with an isocyanate group, may be reacted with an organic polyisocyanate in accordance with the process of the present invention. The active hydrogen atoms are usually attached to oxygen, nitrogen or sulfur atoms. Thus, suitable active hydrogen containing groups as determined by the Zerewitinoff method which are reactive with an isocyanate group include —OH, —NH$_2$, —NH—, —COOH, —SH, and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene, and alkyne diols, triols, tetrols, and the like, aliphatic thiols including alkane, alkene and alkyne thiols having two or more —SH groups; polyamines including both aromatic aliphatic and heterocyclic diamines, triamines, tetramines, and the like; as well as mixtures thereof. Of course, compounds which contain two or more different groups within the above-defined classes may also be used in accordance with the process of the present invention, such as, for example, amino alcohols which contain an amino group and an hydroxyl group, amino alcohols which contain two amino groups and one hydroxyl group, and the like. Also, compounds may be used which contain one —SH group and one —OH group or two —OH groups and one —SH group as well as those which contain an amino group and a —SH group, and the like.

The molecular weight of the organic compound containing at least two active hydrogen containing groups is not critical. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used, such as are obtained, for example, from polycarboxylic acids and polyhydric alcohols. Any suitable polycarboxylic acid may be used, such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid, and the like. Any suitable polyhydric alcohol may be used, such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol, and the like.

Any suitable polyhydric polyalkylene ether may be used, such as, for example, the condensation product of an alkylene oxide or of an alkylene oxide with a polyhydric alcohol. Any suitable polyhydric alcohol may be used, such as, those disclosed above for use in the preparation of the hydroxyl polyesters. Any suitable alkylene oxide may be used, such as, for example, ethylene oxide, propylene oxide, butylene oxide, amylene oxide, and the like. Of course, the polyhydric polyalkylene ethers can be prepared from other starting materials, such as, for example, tetrahydrofuran, epihalohydrins, such as, for example, epichlorohydrin, and the like, as well as aralkylene oxides, such as, for example, styrene oxide, and the like. The polyhydric polyalkylene ethers may have either primary or secondary hydroxyl groups and preferably are polyhydric polyalkylene ethers prepared from alkylene oxides having from two to five carbon atoms, such as, for example, polyethylene ether glycols, polypropylene ether glycols, polybutylene ether glycols, and the like. It is often advantageous to employ some trihydric or higher polyhydric alcohol, such as, glycerine, trimethylolpropane, pentaerythritol, and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process, such as, for example, the process disclosed by Wurtz in 1859 and in Encyclopedia of Chemical Technology, volume 7, pages 257 to 262, published by Interscience Publishers, Inc. (1951), or in U.S. Patent 1,922,459.

Any suitable polyhydric polythioether may be used, such as, for example, the condensation product of thiodiglycol or the reaction product of a polyhydric alcohol, such as is disclosed above for the preparation of the hydroxyl polyesters with any other suitable thioether glycol. Other suitable polyhydric polythioethers are disclosed in U.S. Patent 2,862,972 and 2,900,368.

The hydroxyl polyester may also be a polyester amide, such as is obtained, for example, by including some amine or amino alcohol in the reactants for the preparation of the polyesters. Thus, polyester amides may be obtained by condensing an amino alcohol, such as, ethanol-amine, with the polycarboxylic acids set forth above or they may be made using the same components that make up the hydroxyl polyester with only a portion of the components being a diamine, such as, ethylene diamine and the like.

Any suitable polyacetal may be used, such as, for example, the reaction product of formaldehyde or other suitable aldehyde with a polyhydric alcohol, such as those disclosed above for use in the preparation of the hydroxyl polyesters.

Any suitable aliphatic polyol may be used, such as, for example, alkane diols, such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexanediol, 1,7-heptane diol, 2,2-dimethyl-1,3-propane diol, 1,8-octane diol, and the like, including 1,20-eicosane diol and the like; alkene diols, such as, for example, 1-butene-1,4-diol, 1,3-butadiene-1,4-diol, 2-pentene-1,5-diol, 2-hexene-1,6-diol, 2-heptene-1,7-diol, and the like; alkyne diols, such as, for example, 2-butyne-1,4-diol, 1,5-hexadiyne-1,6-diol, and the like; alkane triols, such as, for example, 1,3,6-hexanetriol, 1,3,7-heptane triol, 1,4,8-octane triol, 1,6,12-dodecane triol, and the like; alkene triols, such as, 1-hexene-1,3,6-triol, and the like; alkyne triols, such as, 2-hexyne-1,3,6-triol, and the like; alkane tetrols, such as, for example, 1,2,5,6-hexane tetrol, and the like; alkene tetrols, such as, for example, 3-heptene-1,2,6,7-tetrol, and the like; alkyne tetrols, such as, for example, 4-octyne-1,2,7,8-tetrol, and the like.

Any suitable aliphatic thiol including alkane thiols containing two or more —SH groups may be used, such as, for example, 1,2-ethane dithiol, 1,2-propane dithiol, 1,3-propane dithiol, 1,6-hexane dithiol, 1,3,6-hexane trithiol, and the like; alkene thiols, such as, for example, 2-butene-1,4-dithiol, and the like; alkyne thiols, such as, for example, 3-hexyne-1,6-dithiol, and the like.

Any suitable polyamine may be used including, for example, aromatic polyamines, such as, for example, p-amino aniline, 1,5-diamino naphthalene, 2,4-diamino tolylene, 1,3,5-benzene triamine, 1,2,3-benzene triamine, 1,4,5,8-naphthalene tetramine, and the like; aliphatic polyamines, such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine, and the like; heterocyclic polyamines, such as, for example, 2,6-diamino pyridine, 2,4-diamino-5-aminoethyl pyrimidine, 2,5-diamino-1,3,4-thiadiazol, and the like.

Other alcohol compounds which do not necessarily fit within any of the previously set forth classes of compounds and which nevertheless contain active hydrogen containing groups which are quite suitable for the production of the polyurethane plastics of the present invention are pentaerythriol, sorbitol, triethanolamine, mannitol, N,N,N',N' - tetrakis(2 - hydroxypropyl)ethylene diamine, as well as compounds of any of the classes set forth above which are substituted with halogen, such as, for example, chloro, bromo, iodo, and the like; nitro; alkoxy, such as, for example, methoxy, ethoxy, propoxy, butoxy, and the like; carboalkoxy, such as, for example, carbomethoxy, carbethoxy, and the like; dialkyl amino, such as, for example, dimethyl amino, diethyl amino, dipropyl amino, methylethyl amino, and the like; mercapto, carbonyl, thiocarbonyl, phosphoryl, phosphato, and the like.

Polyhydroxyl compounds obtained by the alcoholysis of natural fats and oils, such as, for example, castor oil, may also be used.

The isocyanate:reactive hydrogen ratio in the polyurethane reaction mass may vary within wide limits. It depends on the degree of pigmentation and on the degree of branching of the reaction components. It will generally be between 0.8:1 and 1.4:1. The hardness of the polyurethane increases as the degree of branching increases.

The chemically water-binding substances used in accordance with the invention are liquid or solid, and they are, therefore, of particular importance for clear, transparent or translucent as well as for filled and pigmented polyurethane masses. Practically all pigments and fillers that are customarily used in practice are suitable. Alkaline pigments have an accelerating effect on the isocyanate/reactive hydrogen addition reaction and may considerably shorten the time required for processing the mixtures of polyisocyanates and active hydrogen containing compounds. They are, therefore, generally used only for those combinations which require long reaction times.

Pigments and fillers which have a high water content, for example, precipitated silicic acids, should be dewatered by heating to about 200° C. before they are used. Pigmentation and filling is carried out in the reactive hydrogen containing compound by the usual processes, e.g., with high speed stirrers, kneading machines, single or triple rolling mills, ball mills, or sand mills. The degree of pigmentation and filling depends on the processing methods used and on the purpose for which the product is intended. It may be 600% and more. In addition to pigments and fillers, it is possible to add substance which dissolve in the active hydrogen containing compounds. These substances include resins, pitch coal tars, and natural and synthetic asphalt (bitumens). Thus, for example, polypropylene glycols and castor oil dissolve a number of pitch coal tars and bitumens.

The polyurethane masses prepared by the process of the invention from polyisocyanates and reactive hydrogen containing compounds are suitable for use as floor coatings, acid- and alkali-resistant linings, casting resins for electrical purposes, plastic materials, rubber-like elastomers, substances for sealing joints, acid- and alkali-resistant mortar, coverings for tar and concrete roads, and bridge planks. The polyurethane masses may be applied by the usual processes, such as, painting, spraying, casting, or rolling. The method used will generally depend on the service life of the material.

*Example 1*

A paste of pigments and fillers is prepared in a mixture of castor oil and polypropylene oxide and thoroughly mixed in a kneading machine. The mixture (Paste A) contains the following constituents:

| | Parts by weight |
|---|---|
| Commercial castor oil | 6.5 |
| Propoxylated trimethylol propane (OH number 379) | 7.9 |
| Quartz powder | 15.7 |
| Quartz sand | 53.0 |
| Manganese blue | 5.7 |

The chemically water binding substance is added before the treatment in the kneading machine. The paste obtained in the kneading process is left to stand for one week at room temperature in order to allow the chemical binding of water to be completed. About 11.2 parts of commercial liquid 4,4'-diphenylmethane diisocyanate is then added and the mixture thoroughly stirred. The polyurethane mass obtained is then poured into molds or applied as floor covering onto concrete or iron by doctor rollers.

The following chemically water-binding substances are used:

| Chemically water-binding agent | Parts by weight added to 100 parts of mixture of Paste A and diisocyanate | Hardening time | Formation of foam and bubbles |
| --- | --- | --- | --- |
| o-Formic acid ethyl ester | 4.3 | 480 | None. |
| Do | 2.86 | 360 | Do. |
| Do | 1.46 | 240 | Some foam. |
| Do | 0.72 | 180 | Marked. |
| Phosphorous acid trichlorotriethyl ester | 5.74 | 300 | None. |
| Do | 5 | 310 | Do. |
| Do | 4.3 | 280 | Hardly any. |
| Do | 2.86 | 240 | Some. |

*Example 2*

About 100 parts by weight of propoxylated trimethylolpropane (OH number 379) are mixed with about 4 parts by weight of orthoformic acid ethyl and then added to about 95 parts by weight of liquid diphenylmethane diisocyanate. After stirring, the casting mass is poured into metal molds which have been treated with a mold separating agent. The substance hardens in about 15 hours at about 20° C.

Castings free from bubbles are obtained. They are dark in color owing to the color of the diisocyanate used. The products were subsequently heated for about 5 hours at about 80° C. before the mechanical properties were determined.

Impact strength _____kp. cm./cm.$^2$__ 75
Flexural strength _____kp./cm.$^2$__ 1200
Deflection _____mm__ 15
Ball pressure hardness _____kp./cm.$^2$__ 1400
Martens dimensional stability under heat ___° C__ 62
Dielectric strength _____kv./cm__ 140
Specific resistance _____ohm-cm__ 5.10$^{12}$

*Example 3*

About 180 parts of fine asbestos powder and about 50 parts by weight of titanium dioxide (rutile type) are mixed in with about 600 parts by weight of a polyester of adipic acid and diethyleneglycol (OH number 56; acid number <1). About 1 part by weight of tin octoate and about 25 parts by weight of ortho-formic acid ethyl ester are also added. The mixture is left to stand and about 160 parts by weight of commercial diphenyl-methane-4,4'-diisocyanate are then added. The mixture, which is capable of being poured, has a pouring life of about 2 hours. The homogeneous mixture is poured into dry joints. The mass solidifies after about 4 hours without changing in volume. In a comparative experiment carried out without the use of orthoformic acid ethyl ester, the mass foams up in the process of solidifying and escapes from the joint.

*Example 4*

About 100 parts by weight of castor oil are mixed with about 3 parts by weight of orthoformic acid ethyl ester and added to about 42 g. of liquid diphenylmethane diisocyanate. After hardening at room temperature, homogeneous elastic castings free from bubbles and with the following properties are obtained.

Tensile strength _____kp./cm.$^2$__ 23
Elongation _____percent__ 120
Dielectric resistance _____kv./cm__ 200
Specific resistance _____ohm-cm__ 5.10$^{12}$

*Example 5*

About 175 parts by weight of castor oil (4.9% OH) and about 75 parts by weight of blown castor oil (viscosity 2800 cp./75°) are mixed with about 10 parts by weight of o-formic acid ethyl ester. The following filler mixture is added using a triturating machine: about 70 parts by weight of barium sulphate, about 40 parts by weight of calcium carbonate and about 125 parts by weight of iron oxide. The mixture is left to stand for about 48 hours and about 125 parts by weight of commercial diphenylmethane-4,4'-diisocyanate are then added. The time required for processing is about 25 minutes at room temperature. The lacquer mixture is applied onto a base with a brush or a spray gun. Elastic lacquer coatings free from bubbles are obtained which have the following properties after being left to dry for about 2 hours at about 80°:

Albert-König hardness (DIN 53157) _____sec__ 42
Erichsen cupping (DIN 53156) _____mm__ 8.4

The lacquer films are particularly resistant to acids.

*Example 6*

A road tar with a viscosity (measured in a road tar viscosimeter, 10 mm. nozzle) of about 250 to 500 seconds is liquefied by heating then stirred and poured into a polyhydroxyl compound or into a mixture of polyhydroxyl compounds. After cooling, orthoformic acid ethyl ester is added and the mixture is left to stand for about 4 days to allow for chemical binding of water. Commercial 4,4'-diphenylmethane diisocyanate is then added and the mixture is thoroughly stirred and poured into molds or spread onto a concrete surface.

(a)

| | Parts by wt. |
| --- | --- |
| Propoxylated trimethylolpropane (OH number 379) | 17.1 |
| Linear polypropylene glycol (OH number 56) | 8.5 |
| Road tar | 50.0 |
| Orthoformic acid ethyl ester | 5.0 |
| Commercial 4,4'-diphenylmethane-diisocyanate | 24.4 |

(b)

| | |
| --- | --- |
| Castor oil | 31.6 |
| Road tar | 50.0 |
| Orthoformic acid ethyl ester | 5.0 |
| Commercial 4,4'-diphenylmethane-diisocyanate | 18.4 |

(c)

| | |
| --- | --- |
| Castor oil | 17.7 |
| Hexanediol | 4.7 |
| Road tar | 50.0 |
| Orthoformic acid ethyl ester | 5.0 |
| Commercial 4,4-diphenylmethane-diisocyanate | 26.6 |

(d)

| | |
| --- | --- |
| Castor oil | 17.0 |
| Hexanetriol | 50.0 |
| Road tar | 50.0 |
| Orthoformic acid ethyl ester | 5.0 |
| Commercial 4,4'-diphenylmethane-diisocyanate | 28.8 |

(e)

| | Parts by wt. |
|---|---|
| Products of alcoholysis of 1 mol castor oil and 2 mols trimethylolpropane (OH number 380) | 21.4 |
| Road tar | 50.0 |
| Orthoformic acid ethyl ester | 5.0 |
| Commercial 4,4'-diphenylmethane-diisocyanate | 28.6 |

Polyurethane masses obtained according to (a), (c), (d), and (e) are not attacked by benzene. No benzene resistant masses are obtained by (b). The resistance to benzene is tested by allowing benzene to act on the polyurethane masses for a short time and then placing white filter paper with light pressure onto the moist part. If the polyurethane mass is resistant to benzene, the paper is not discolored in this test.

*Example 7*

(a)

| | Parts by wt. |
|---|---|
| Branched polyester (OH number 396) from phthalic acid anhydride, trimethylolpropane, and ethylene glycol | 9.6 |
| Ethylene glycol | 9.6 |
| Triethanolamine | 0.5 |
| Orthoformic acid ethyl ester | 4 |
| Polyisocyanate with biuret structure from 3 mols hexamethylenediisocyanate and 1 mol water according to German Patent 1,101,394 | 80.3 |

The components are mixed in the heat without polyisocyanate and left to cool. The polyisocyanate is then stirred into the cold mixture and the mixture is exposed to a vacuum to remove any air bubbles and then poured into molds. A very hard product is obtained.

(b)

| | Parts by wt. |
|---|---|
| Branched polyester (OH number 290) of adipic acid, phthalic acid, and trimethylolpropane | 20 |
| Ethylene glycol | 20 |
| Triethanolamine | 1 |
| Orthoformic acid ethyl ester | 8 |
| Polyisocyanate as under (a) | 150 |

The same procedure is carried out as under (a). The products vary from hard to elastic according to the temperature employed. The viscosity may be controlled by the addition of cyclohexanone.

(c)

| | Parts by wt. |
|---|---|
| Branched polyester as under (b) | 29.2 |
| Octadecenediol | 15.8 |
| Orthoformic acid ethyl ester | 5 |
| Polyisocyanate as under (a) | 55 |

The same method is used as under (a). A very soft elastic product is obtained.

*Example 8*

(a)

| | Parts by wt. |
|---|---|
| Branched polyester as under Example 8 (c) | 33 |
| Orthoformic acid ethyl ester | 3 |
| Polyisocyanate obtained from 3 mols tolylene diisocyanate and 1 mol trimethylolpropane | 40 |
| Dibutylphthalate | 30 |

The polyester is mixed with ortho-formic acid ethyl and the polyisocyanate is mixed wtih dibutylphthalate with slight heating. The two mixtures are combined when cold and a vacuum applied to remove any air bubbles and poured into molds. A fairly elastic product is obtained which may be subsequently hardened at 50° C.

(b)

| | Parts by wt. |
|---|---|
| Propoxylated trimethylolpropane (OH number 379) | 30 |
| Orthoformic acid ethyl ester | 4 |
| Polyisocyanate according to (a) | 48 |
| Dibutylphthalate | 48 |

The method described under (a) is employed. A very soft elastic product is obtained.

(c)

| | Parts by wt. |
|---|---|
| Propoxylate trimethylolpropane (OH number 379) | 40 |
| Orthoformic acid ethyl ester | 11 |
| Titanium dioxide | 75 |
| Polyisocyanate according to (a) | 65 |
| Dibutylphthalate | 45 |

The clear solution of trimethylolpropane and orthoformic acid ethyl ester is triturated with titanium dioxide in a cone mill. The polyisocyanate dissolves in dibutyl-phthalate with slight heating. When cold, the two solutions are combined and a vacuum is applied to remove any air bubbles and it is then poured into molds. An elastic pure white product is obtained.

*Example 9*

(a)

About 43 parts by weight of a branched polyester (OH number 160) of adipic acid, butylene glycol and trimethylolpropane, about 43 parts by weight of a linear polyester (OH number 40) of adipic acid and diethylene glycol and about 4 parts by weight of orthoformic acid ethyl ester are mixed together while warm. After cooling, about 14 parts by weight tolylene diisocyanate are added and a vacuum is applied to the mixture to remove bubbles and it is then poured into molds. A very soft and elastic product is obtained.

(b)

| | Parts by wt. |
|---|---|
| Branched polyester (OH number 210) of adipic acid, butylene glycol, and trimethylol-propane | 38.4 |
| Branched polyester (OH number 160) of adipic acid, butylene glycol, and trimethylol-propane | 38.4 |
| Orthoformic acid ethyl ester | 4 |
| Tolylenediisocyanate | 23.2 |

The method described under (a) is employed. A harder, but still elastic product is obtained.

*Example 10*

About 13.9 parts by weight of a branched polyester according to Example 8(a), about 13.9 parts by weight commercial castor oil, about 50 parts by weight of road tar, and about 5 parts by weight of phosphorus acid-trichlorotriethylester are mixed together while warm. After cooling, about 22.2 parts by weight of commercial diphenylmethane diisocyanate are added, and the mixture is poured into mold. A very elastic product is obtained.

*Example 11*

A paste is made from the following mixture

| | Parts by wt. |
|---|---|
| Technical grade castor oil | 6.5 |
| Propoxylated trimethylol propane (OH number 379) | 7.9 |
| Quartz flour | 15.7 |
| Quartz sand | 53.0 |
| Manganese blue | 5.7 |

The orthoformic acid ester is added in the kneader. The resulting paste is mixed with 11.2 parts by weight of crude liquid 4,4'-diphenylmethane diisocyanate while stirring. The polyurethane mass is casted into molds or is employed as a floor cover on an iron or concrete surface with a doctor blade.

The following table gives the orthoformic acid ester in parts by weight per 100 parts of the paste plus diisocyanate and the time for solidification in minutes of the mass after application. No blisters are to be seen.

| | | |
|---|---|---|
| Methyl ester | 4.3 | 240 |
| Butyl ester | 4.3 | 300 |
| Do | 2.86 | 195 |
| Do | 1.43 | 195 |

Although the invention has been described in considerable detail in the foregoing it is to be understood that such detail is solely for the purpose of illustration and that variations may be made by those skilled in the art without departing from the spirit and scope of the invention, except as set forth in the claims.

What is claimed is:

1. A method for the preparation of polyurethanes substantially free from bubbles and foam caused by the introduction of water with the reactants which comprises mixing an organic polyisocyanate with an organic compound containing at least two active hydrogen containing groups as determined by the Zerewitinoff method, and a lower alkyl ester of orthoformic acid as a water-binding agent.

2. In a process of preparing a polyurethane comprising mixing an organic polyisocyanate with an organic compound containing at least two active hydrogen containnig groups as determined by the Zerewitinoff method and water in a reaction mixture, the improvement which comprises incorporating a lower alkyl ester of orthoformic acid in the mixture as a water-binding agent and hydrolyzing the alkyl ester to split off an alcohol, thereby substantially eliminating bubbles and foam.

3. The improvement of claim 2 wherein the alkyl ester is present at a concentration of from about 2% to about 6% by weight of the reaction mixture.

4. The method of claim 3 in which the alkyl ester is orthoformic acid ethyl ester.

5. The method of claim 3 in which the organic compound containing at least two active hydrogen containing groups as determined by the Zerewitinoff method has a molecular weight of at least 200 with a hydroxyl number of at least 25, and an acid number below 5.

6. The method of claim 5 in which the organic compound containing active hydrogen containing groups is a polyester.

References Cited

UNITED STATES PATENTS

| | | | |
|---|---|---|---|
| 2,953,533 | 9/1960 | Khawam | 260—2.5 |
| 3,041,295 | 6/1962 | Wiech et al. | 260—2.5 |
| 3,041,296 | 6/1962 | Lindlaw et al. | 260—2.5 |
| 3,171,819 | 3/1965 | Powanda | 260—2.5 |
| 3,208,959 | 9/1965 | Gmitter | 260—2.5 |

FOREIGN PATENTS

| | | |
|---|---|---|
| 831,301 | 3/1960 | Great Britain. |
| 843,796 | 8/1960 | Great Britain. |
| 857,876 | 1/1961 | Great Britain. |
| 1,143,634 | 2/1963 | Germany. |
| 1,321,178 | 2/1963 | France. |

DONALD E. CZAJA, *Primary Examiner.*

LEON J. BERCOVITZ, *Examiner.*

F. McKELVEY, *Assistant Examiner.*